United States Patent
Wang et al.

(10) Patent No.: US 10,372,719 B2
(45) Date of Patent: Aug. 6, 2019

(54) EPISODE MINING DEVICE, METHOD AND NON-TRANSITORY COMPUTER READABLE MEDIUM OF THE SAME

(71) Applicant: INSTITUTE FOR INFORMATION INDUSTRY, Taipei (TW)

(72) Inventors: Ping-Feng Wang, Taipei (TW); Shin-Mu Tseng, Tainan (TW); Chu-Feng Li, Miaoli County (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 297 days.

(21) Appl. No.: 15/369,902

(22) Filed: Dec. 6, 2016

(65) Prior Publication Data

US 2018/0157718 A1    Jun. 7, 2018

(51) Int. Cl.
*G06F 7/00* (2006.01)
*G06F 17/30* (2006.01)
*G06F 16/2458* (2019.01)
*G06F 17/00* (2019.01)

(52) U.S. Cl.
CPC ...... *G06F 16/2465* (2019.01); *G06F 2216/03* (2013.01)

(58) Field of Classification Search
CPC .......... G06F 17/30539; G06F 16/2465; G06F 2216/03

See application file for complete search history.

(56) References Cited

U.S. PATENT DOCUMENTS

2006/0195444 A1* 8/2006 Sastry ............... G06F 17/30539

* cited by examiner

*Primary Examiner* — Kannan Shanmugasundaram
(74) *Attorney, Agent, or Firm* — CKC & Partners Co., LLC

(57) ABSTRACT

An episode mining method that includes the steps outlined below is provided. Real-time operation parameters are retrieved. At least one incremental candidate pattern in every incremental time period is generated, wherein the incremental candidate pattern is an incremental episode including a set of events of the real-time operation parameters and having an incremental occurrence frequency larger than an incremental threshold. At least one batch candidate pattern in every batch time period is generated, wherein the batch candidate pattern is a batch episode including a set of events of the real-time operation parameters within the batch time period and having a batch occurrence frequency larger than a batch threshold. At least one newly-add candidate episode is determined from the incremental candidate pattern and the batch candidate pattern having an occurrence frequency larger than a determine threshold. At least one detection rule is generated based on the newly-add candidate episode.

11 Claims, 3 Drawing Sheets

|  | Batch: Frequently | Batch: Not frequently |
|---|---|---|
| Incremental: Frequently | Newly-add | $\dfrac{\Delta s \times \|\Delta D\|}{\|D\| + \|\Delta D\|}$ |
| Incremental: Not frequently | $\dfrac{s \times \|D\|}{\|D\| + \|\Delta D\|}$ | Not taken into consideration |

EPISODE MINING DEVICE, METHOD AND NON-TRANSITORY COMPUTER READABLE MEDIUM OF THE SAME

BACKGROUND

Field of Invention

The present invention relates to a data mining technology. More particularly, the present invention relates to an episode mining device, method and non-transitory computer readable medium of the same.

Description of Related Art

Episode mining is the computational process of discovering patterns in large data sets. The overall goal of the episode mining process is to extract information from a data set and transform it into an understandable structure for further use. In conventional episode mining, serial data are analyzed to generate candidate patterns. Subsequently, lots of scanning and comparisons of the serial data with the history data in the database are needed to generate the required patterns. However, each of the repetitive scanning needs to be performed on all of the history data of the database. Such scanning procedure takes a lot of time and results in low efficiency.

Accordingly, what is needed is an episode mining device, method and non-transitory computer readable medium of the same to address the above issues.

SUMMARY

The invention provides an episode mining device that includes a sensing module, a storage module and a processing module. The sensing module is configured to sense a plurality of real-time operation parameters from an operation device. The storage module is configured to store a plurality of historical candidate episodes and a plurality of computer executable instructions, wherein the instructions include a delta episode mining unit, a batch episode mining unit, a pattern integration unit and a rule generation unit. The delta episode mining unit is configured to receive the real-time operation parameters to generate at least one incremental candidate pattern in every incremental time period, wherein the incremental candidate pattern is an incremental episode comprising a set of events of the real-time operation parameters and having an incremental occurrence frequency larger than an incremental threshold. The batch episode mining unit is configured to receive the real-time operation parameters and the historical candidate episodes to generate at least one batch candidate pattern in every batch time period, wherein the batch candidate pattern is a batch episode comprising a set of events of the real-time operation parameters within the batch time period and having a batch occurrence frequency larger than a batch threshold. The pattern integration unit is configured to determine at least one newly-add candidate episode from the incremental candidate pattern and the batch candidate pattern having an occurrence frequency larger than a determine threshold. The rule generation unit is configured to generate at least one detection rule based on the newly-add candidate episode. The processing module is electrically coupled to the storage unit and the sensing module and configured to execute the computer executable instructions.

Another aspect of the present invention is to provide an episode mining method used in an episode mining device that includes a sensing module configured to sense a plurality of real-time operation parameters from an operation device, a storage module that stores a plurality of historical candidate episodes and a plurality of computer executable instructions and a processing module electrically coupled to the storage unit and the sensing module, wherein the processing module executes the instructions to execute the episode mining method. The episode mining method includes the steps outlined below. At least one incremental candidate pattern in every incremental time period is generated, wherein the incremental candidate pattern is an incremental episode including a set of events of the real-time operation parameters and having an incremental occurrence frequency larger than an incremental threshold. At least one batch candidate pattern in every batch time period is generated, wherein the batch candidate pattern is a batch episode including a set of events of the real-time operation parameters within the batch time period and having a batch occurrence frequency larger than a batch threshold. At least one newly-add candidate episode is determined from the incremental candidate pattern and the batch candidate pattern having an occurrence frequency larger than a determine threshold. At least one detection rule is generated based on the newly-add candidate episode.

Yet another aspect of the present invention is to provide a non-transitory computer readable medium that stores a computer program including a plurality of computer readable instructions to execute a episode mining method used in an episode mining device, the episode mining device includes a sensing module configured to sense a plurality of real-time operation parameters from an operation device, a storage module that stores a plurality of historical candidate episodes and a plurality of computer executable instructions and a processing module electrically coupled to the storage unit and the sensing module, wherein the processing module executes the instructions to execute the episode mining method. The episode mining method includes the steps outlined below. At least one incremental candidate pattern in every incremental time period is generated, wherein the incremental candidate pattern is an incremental episode including a set of events of the real-time operation parameters and having an incremental occurrence frequency larger than an incremental threshold. At least one batch candidate pattern in every batch time period is generated, wherein the batch candidate pattern is a batch episode including a set of events of the real-time operation parameters within the batch time period and having a batch occurrence frequency larger than a batch threshold. At least one newly-add candidate episode is determined from the incremental candidate pattern and the batch candidate pattern having an occurrence frequency larger than a determine threshold. At least one detection rule is generated based on the newly-add candidate episode.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
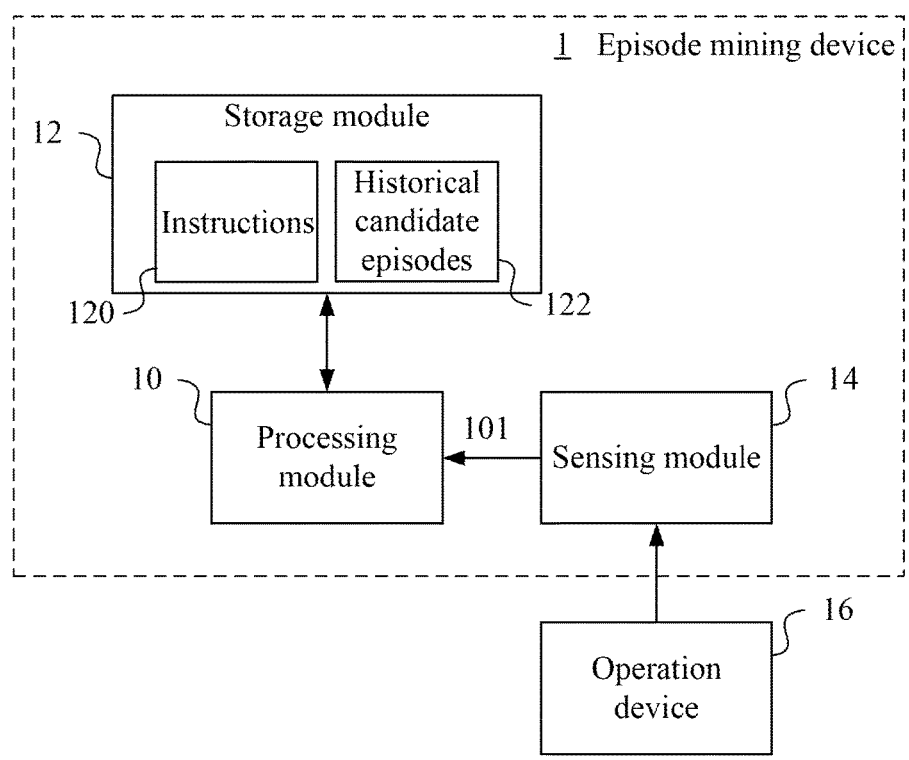
FIG. 1 is a block diagram of an episode mining device in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Reference is now made to FIG. 1. FIG. 1 is a block diagram of an episode mining device 1 in an embodiment of the present invention. The episode mining device 1 includes a processing module 10, a storage module 12 and a sensing module 14.

The processing module 10 is coupled to the storage module 12 and the sensing module 14. The processing module 10 can be any processor that has the ability to perform data operation. The processing module 10 performs data transmission with the modules described above by using different types of data transmission paths. In different embodiments, the storage module 12 can be such as, but not limited to a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

In an embodiment, the sensing module 14 may include a plurality of sensors to sense a plurality of real-time operation parameters 101 from an operation device 16. In an embodiment, the operation device 16 can be such as, but not limited to a boiler. The real-time operation parameters 101 may include parameters of the operation conditions of the boiler.

It is appreciated that the components mentioned above are exemplarily described. In other embodiments, the episode mining device 1 may include other types of components.

The storage module 12 is configured to store a plurality of computer executable instructions 120. The instructions 120 operate as a plurality of modules when the instructions 120 are executed by the processing module 10 to provide the function of the episode mining device 1. The processing procedure of the operation of the episode mining device 1 performed by the processing module 10 is described in the following paragraphs.

Figures 2, 3:
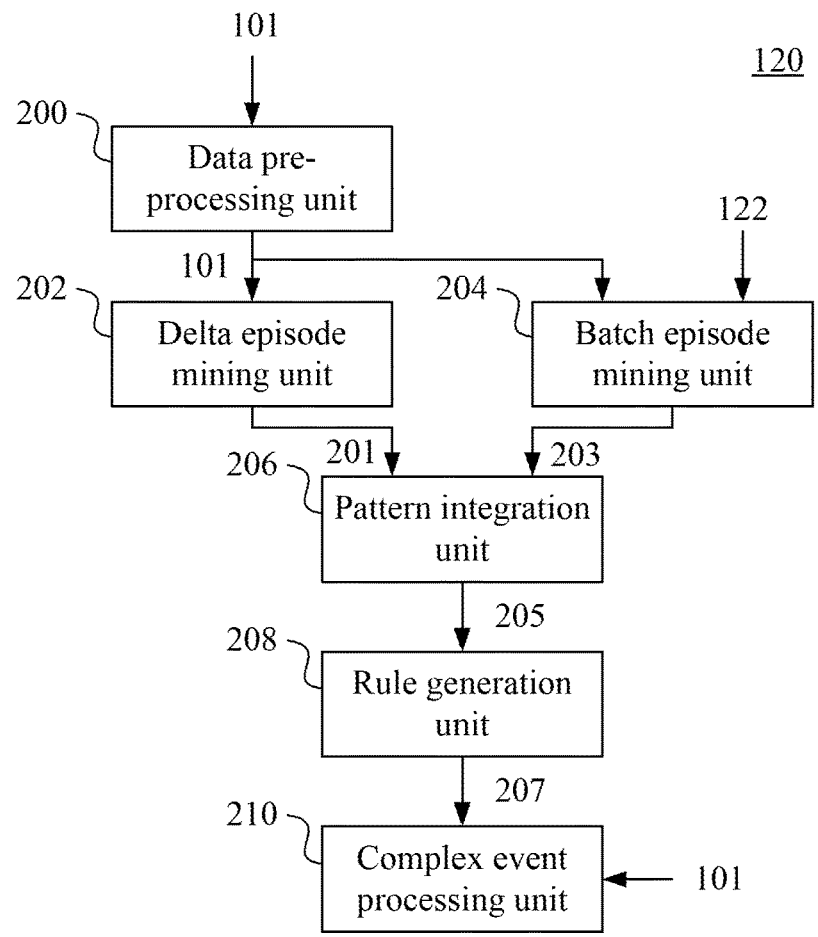
FIG. 2 is a block diagram of the instructions in FIG. 1 executed by the processing module in an embodiment of the present invention.
FIG. 3 is a diagram illustrating conditions of the occurrence frequency of the episodes in an embodiment of the present invention.

Reference is now made to FIG. 2. FIG. 2 is a block diagram of the instructions 120 in FIG. 1 executed by the processing module 10 in an embodiment of the present invention. In the present embodiment, the instructions 120 include a data pre-processing unit 200, a delta episode mining unit 202, a batch episode mining unit 204, a pattern integration unit 206 and a rule generation unit 208.

The detail description of the operation of each of the modules is made in the following paragraphs.

The data pre-processing unit 200 is configured to perform categorization, integration, conversion, normalization or a combination thereof on the real-time operation parameters 101. In an embodiment, the data pre-processing unit 200 categorizes the real-time operation parameters 101 into characteristic groups, control parameters and monitoring parameters. For example, when the operation device 16 is a boiler, the real-time operation parameters 101 may be categorized into different characteristic groups. For instance, some of the real-time operation parameters 101 are categorized based on the types of the coals used in the boiler, and some of the real-time operation parameters 101 are categorized based on the amount of the load.

Further, the real-time operation parameters 101 can be categorized into the control parameters that include such as, but not limited to primary air temperatures and rotation speeds of a mill, and the monitoring parameters that include such as, but not limited to furnace temperatures, exit temperatures and spray amounts of water.

The delta episode mining unit 202 is configured to receive the real-time operation parameters 101 to generate at least one incremental candidate pattern 201 in every incremental time period. In an embodiment, the incremental time period can be such as, but not limited to 30 seconds or a minute.

The incremental candidate pattern 201 is an incremental episode including a set of events of the real-time operation parameters 101 and having an incremental occurrence frequency larger than an incremental threshold.

It is appreciated that one set of events of the real-time operation parameters 101 may include the event of an operation parameter and/or the event of a monitoring parameter. For example, the real-time operation parameters 101 may include operation conditions (turn-on or turn-off) of soot-blowing unit (not illustrated) used to perform soot-blowing on the boiler and a furnace temperature. The set of events can be an incremental episode that three specific soot-blowing units are in operation and the furnace temperature is higher than a threshold. In another example, the set of events can also be another episode that five specific soot-blowing units are in operation and the furnace temperature is lower than the threshold.

Such incremental episode may occur several times within the incremental time period. As a result, in an embodiment, the occurrence frequency of the incremental episode is a ratio of occurrence times of the episode relative to the occurrence times of all episodes within the incremental time period. When the occurrence frequency of the incremental episode is larger than an incremental threshold, such as but not limited to 80%, such an episode is determined to be an incremental candidate pattern 201.

In an embodiment, the storage module 12 illustrated in FIG. 1 can store historical candidate episodes 122, in which each of the historical candidate episodes 122 are selected to represent a certain episode that occurs frequently in the history. For example, when a historical occurrence frequency of an episode that three specific soot-blowing units are in operation and the furnace temperature is higher than a threshold, such an episode is selected as one of the historical candidate episodes 122.

The batch episode mining unit 204 is configured to receive the real-time operation parameters 101 and the historical candidate episodes 122 to generate at least one batch candidate pattern 203 in every batch time period. In an embodiment, the batch time period can be such as, but not limited to one day or a week.

The batch candidate pattern 203 is a batch episode including a set of events of the real-time operation parameters 101 within the batch time period and having a batch occurrence frequency larger than a batch threshold.

Identical to the incremental episode, the batch episode is a set of events of the real-time operation parameters 101. Such batch episode may occur several times within the batch time period. As a result, in an embodiment, the occurrence frequency of the batch episode is a ratio of occurrence times of the batch episode relative to the occurrence times of the historical candidate episodes 122 including the same set of events. When the occurrence frequency of the batch episode is larger than a batch threshold, such as but not limited to 80%, such an episode is determined to be a batch candidate pattern 203.

The pattern integration unit 206 is configured to determine at least one newly-add candidate episode 205 from the incremental candidate pattern 201 and the batch candidate pattern 203 having an occurrence frequency larger than a determine threshold.

Reference is now made to FIG. 3. FIG. 3 is a diagram illustrating conditions of the occurrence frequency of the episodes in an embodiment of the present invention.

As illustrated in FIG. 3, there are four conditions of episodes. The first condition is that the episodes occur frequently in both the incremental time period and the batch time period. The second condition is that the episodes occur frequently in the incremental time period but do not occur frequently in the batch time period. The third condition is that the episodes occur frequently in the batch time period but do not occur frequently in the incremental time period. The fourth condition is that the episodes do not occur frequently in both the incremental time period and the batch time period.

As a result, when an incremental candidate pattern 201 is also a batch candidate pattern 203, such a pattern falls in the first condition. The pattern integration unit 206 directly determines such a pattern as a newly-add candidate episode 205.

When an incremental candidate pattern 201 is not a batch candidate pattern 203, the second condition is met. As a result, an occurrence frequency of such a pattern relative to the historical candidate episodes and all episodes within the incremental time period is determined. Suppose that the number of the historical candidate episodes is D, all the episodes within the incremental time period is $\Delta D$, and an occurrence possibility of the incremental candidate pattern 201 is $\Delta S$, the occurrence frequency can be calculated as $((\Delta s \times |\Delta D|)/(|D|+|\Delta D|))$. When the occurrence frequency is larger than a threshold, the incremental candidate pattern 201 is determined to be the newly-add candidate episode 205. On the contrary, when the occurrence frequency is not than the threshold, the incremental candidate pattern 201 is not determined to be the newly-add candidate episode 205.

When a batch candidate pattern 203 is not an incremental candidate pattern 201, the third condition is met. As a result, an occurrence frequency of such a pattern relative to the historical candidate episodes and all episodes within the incremental time period is determined. Suppose that the number of the historical candidate episodes is D, all the episodes within the incremental time period is $\Delta D$, and an occurrence possibility of the batch candidate pattern 203 is s, the occurrence frequency can be calculated as $((s \times |D|)/(|D|+|\Delta D|))$. When the occurrence frequency is larger than a threshold, the batch candidate pattern 203 is determined to be the newly-add candidate episode. On the contrary, when the occurrence frequency is not than the threshold, the batch candidate pattern 203 is not determined to be the newly-add candidate episode 205.

When a pattern is not an incremental candidate pattern 201 and not a batch candidate pattern 203 either, such a pattern is not needed to be taken into consideration.

It is appreciated that in an embodiment, a key performance indicator of each of the real-time operation parameters 101 is calculated such that a difference between the parameters in the pattern and the key performance indicator is used to generate a weighting to perform pattern integration. As a result, such a weighting can be used to weight the item related to the incremental candidate pattern 201 in the formula described in FIG. 3.

In an embodiment, the pattern integration unit 206 stores the newly-add candidate episode 205 in the storage module 12 as a part of the historical candidate episodes 122.

The rule generation unit 208 is configured to generate at least one detection rule 207 based on the newly-add candidate episode 205. In an embodiment, the instructions 120 further include a complex event processing unit 210 configured to perform rule detection based on the detection rule 207.

More specifically, the complex event processing unit 210 can receive the real-time operation parameters 101 from the sensing module 14 to determine whether a certain episode occurs and further determine which action should be performed in response. For example, when the episode that the three specific soot-blowing units are in operation is detected according to the detection rule 207 by the complex event processing unit 210, the complex event processing unit 210 may determine that additional soot-blowing units are needed to be turned on to facilitate the soot-blowing efficiency.

Figure 4:
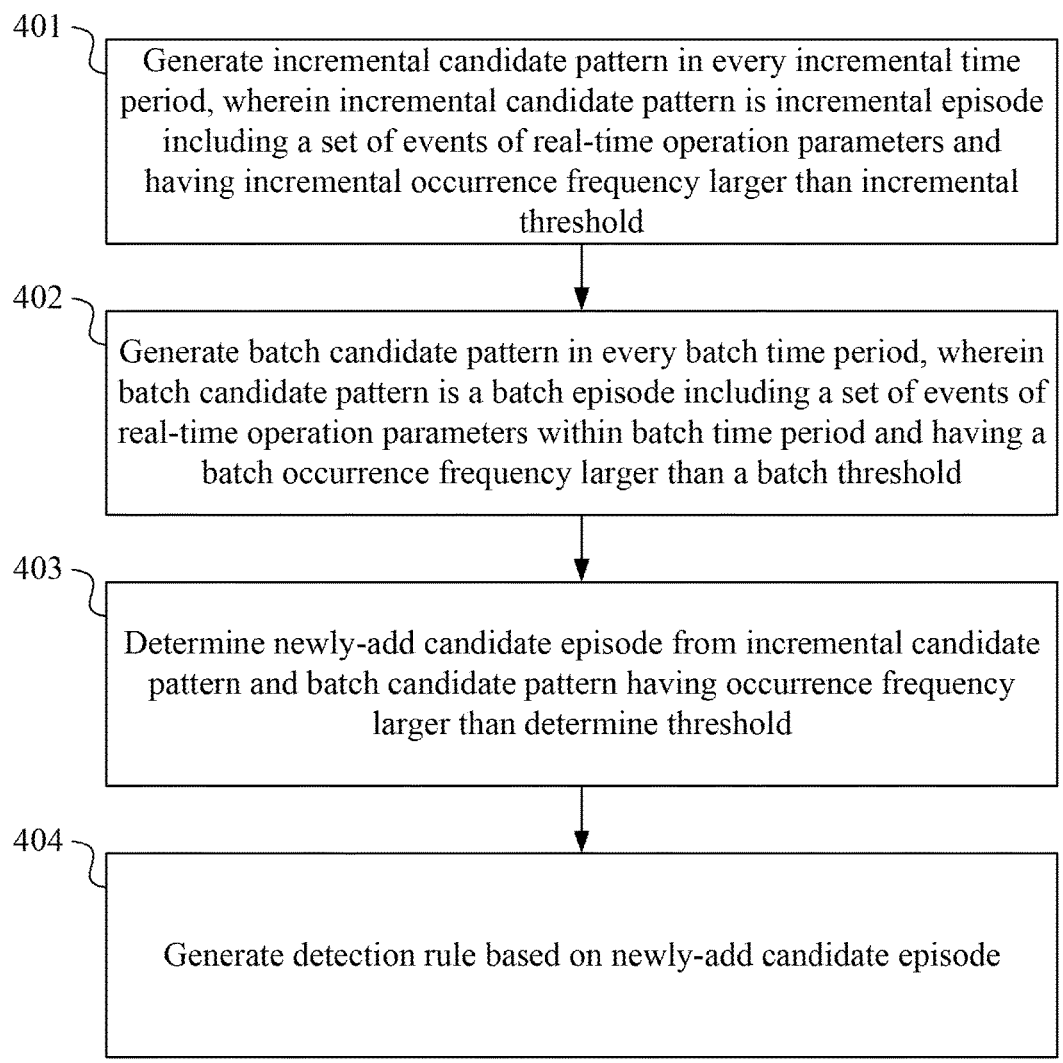
FIG. 4 is a flow chart of an episode mining method in an embodiment of the present invention.

Reference is now made to FIG. 4. FIG. 4 is a flow chart of an episode mining method 400 in an embodiment of the present invention. The episode mining method 400 can be used in the episode mining device 1 illustrated in FIG. 1, or be implemented by using other hardware components such as a database, a common processor, a computer, a server, other unique hardware devices that have a specific logic circuit or an equipment having a specific function, e.g. a unique hardware integrated by a computer program and a processor or a chip. More specifically, the episode mining method 400 is implemented by using a computer program to control the modules in the episode mining device 1. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

The episode mining method 400 comprises the steps outlined below. (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In operation 401, at least one incremental candidate pattern 201 in every incremental time period is generated by the delta episode mining unit 200, wherein the incremental candidate pattern 201 is an incremental episode including a set of events of the real-time operation parameters and having an incremental occurrence frequency larger than an incremental threshold.

In operation 402, at least one batch candidate pattern 203 in every batch time period is generated, wherein the batch candidate pattern 203 is a batch episode including a set of events of the real-time operation parameters within the batch time period and having a batch occurrence frequency larger than a batch threshold.

In operation 403, at least one newly-add candidate episode 205 is determined from the incremental candidate pattern 201 and the batch candidate pattern 203 having an occurrence frequency larger than a determine threshold by the pattern integration unit 206.

In operation 404, at least one detection rule 207 is generated based on the newly-add candidate episode 205 by the rule generation unit 208.

It is appreciated that the steps are not recited in the sequence in which the steps are performed. That is, unless the sequence of the steps is expressly indicated, the sequence of the steps is interchangeable, and all or part of the steps may be simultaneously, partially simultaneously, or sequentially performed.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An episode mining device comprising:
   a sensor configured to sense a plurality of real-time operation parameters from an operation device;
   a storage memory configured to store a plurality of historical candidate episodes and a plurality of computer executable instructions;
   a processor electrically coupled to the storage unit and the sensor and configured to execute the instructions comprising:
      receiving the real-time operation parameters to generate at least one incremental candidate pattern in every incremental time period, wherein the incremental candidate pattern is an incremental episode comprising a set of events of the real-time operation parameters and having an incremental occurrence frequency larger than an incremental threshold;
      receiving the real-time operation parameters and the historical candidate episodes to generate at least one batch candidate pattern in every batch time period, wherein the batch candidate pattern is a batch episode comprising a set of events of the real-time operation parameters within the batch time period and having a batch occurrence frequency larger than a batch threshold;
      determining at least one newly-add candidate episode from the incremental candidate pattern and the batch candidate pattern having an occurrence frequency larger than a determine threshold; and
   generating at least one detection rule based on the newly-add candidate episode processor,
   wherein the incremental occurrence frequency is a ratio of occurrence times of the incremental episode relative to the occurrence times of all historical episodes within the incremental time period,
   wherein the batch occurrence frequency is a ratio of occurrence times of the batch episode relative to the occurrence times of the historical candidate episodes comprising the same set of events,
   wherein the incremental time period is less than the batch time period,
   wherein when the incremental candidate pattern is the batch candidate pattern, the pattern integration unit directly determines the incremental candidate pattern as the newly-add candidate episode,
   wherein when the incremental candidate pattern is not the batch candidate pattern, the occurrence frequency is calculated as $((\Delta s \times |\Delta D|)/(|D|+|\Delta D|))$, wherein the number of the historical candidate episodes is D, all the episodes within the incremental time period is $\Delta D$, and an occurrence possibility of the incremental candidate pattern is $\Delta S$,
   wherein when the batch candidate pattern is not the incremental candidate pattern, the occurrence frequency is calculated as $((s \times |D|)/(|D|+|\Delta D|))$, wherein an occurrence possibility of the batch candidate pattern is s.

2. The episode mining device of claim 1, wherein the instructions executed by the processor further comprises: performing categorization, integration, conversion, normalization or a combination thereof on the real-time operation parameters.

3. The episode mining device of claim 2, wherein the instructions executed by the processor further comprises: categorizing the real-time operation parameters into characteristic groups, control parameters and monitoring parameters.

4. The episode mining device of claim 1, wherein when a first occurrence frequency of the incremental candidate pattern in the historical candidate episodes and all episodes within the incremental time period is larger than a first threshold, the incremental candidate pattern is determined to be the newly-add candidate episode, and when a second occurrence frequency of the batch candidate pattern in the historical candidate episodes and all episodes within the incremental time period is larger than a second threshold, the batch candidate pattern is determined to be the newly-add candidate episode.

5. The episode mining device of claim 1, wherein the instructions executed by the processor further comprises: performing rule detection based on the detection rule.

6. An episode mining method used in an episode mining device that comprises a sensor configured to sense a plurality of real-time operation parameters from an operation device, a storage memory that stores a plurality of historical candidate episodes and a plurality of computer executable instructions and a processor electrically coupled to the storage unit and the sensor, wherein the processor executes the instructions to execute the episode mining method, the episode mining method comprises:
   generating at least one incremental candidate pattern in every incremental time period, wherein the incremental candidate pattern is an incremental episode comprising a set of events of the real-time operation parameters and having an incremental occurrence frequency larger than an incremental threshold;
   generating at least one batch candidate pattern in every batch time period, wherein the batch candidate pattern is a batch episode comprising a set of events of the real-time operation parameters within the batch time period and having a batch occurrence frequency larger than a batch threshold;
   determining at least one newly-add candidate episode from the incremental candidate pattern and the batch candidate pattern having an occurrence frequency larger than a determine threshold; and
   generating at least one detection rule based on the newly-add candidate episode,
   wherein the incremental occurrence frequency is a ratio of occurrence times of the incremental episode relative to the occurrence times of all historical episodes within the incremental time period, wherein the batch occurrence frequency is a ratio of occurrence times of the batch episode relative to the occurrence times of the historical candidate episodes comprising the same set of events, wherein the incremental time period is less than the batch time period, wherein when the incremental candidate pattern is the batch candidate pattern, determining the incremental candidate pattern as the newly-add candidate episode, wherein when the incremental candidate pattern is not the batch candidate pattern, the occurrence frequency is calculated as $((\Delta s \times |\Delta D|)/(|D|+|\Delta D|))$, wherein the number of the historical candidate episodes is D, all the episodes within the incremental time period is $\Delta D$, and an occurrence possibility of the incremental candidate pattern is $\Delta S$, wherein when the batch candidate pattern is not the incremental candidate pattern, the occurrence frequency is calculated as $((s \times |D|)/(|D|+|\Delta D|))$, wherein an occurrence possibility of the batch candidate pattern is s.

7. The episode mining method of claim 6, further comprising performing categorization, integration, conversion, normalization or a combination thereof on the real-time operation parameters.

8. The episode mining method of claim 7, wherein the real-time operation parameters are categorized into characteristic groups, control parameters and monitoring parameters.

9. The episode mining method of claim 6, further comprising:

when a first occurrence frequency of the incremental candidate pattern in the historical candidate episodes and all episodes within the incremental time period is larger than a first threshold, determining the incremental candidate pattern to be the newly-add candidate episode; and when a second occurrence frequency of the batch candidate pattern in the historical candidate episodes and all episodes within the incremental time period is larger than a second threshold, determining the batch candidate pattern to be the newly-add candidate episode.

10. The episode mining method of claim 6, further comprising performing rule detection based on the detection rule.

11. A non-transitory computer readable medium that stores a computer program comprising a plurality of computer readable instructions to execute a episode mining method used in an episode mining device, the episode mining device comprises a sensor configured to sense a plurality of real-time operation parameters from an operation device, a storage memory that stores a plurality of historical candidate episodes and a plurality of computer executable instructions and a processor electrically coupled to the storage memory and the sensor, wherein the processor executes the instructions to execute the episode mining method, the episode mining method comprises:

generating at least one incremental candidate pattern in every incremental time period, wherein the incremental candidate pattern is an incremental episode comprising a set of events of the real-time operation parameters and having an incremental occurrence frequency larger than an incremental threshold;

generating at least one batch candidate pattern in every batch time period, wherein the batch candidate pattern is a batch episode comprising a set of events of the real-time operation parameters within the batch time period and having a batch occurrence frequency larger than a batch threshold;

determining at least one newly-add candidate episode from the incremental candidate pattern and the batch candidate pattern having an occurrence frequency larger than a determine threshold; and generating at least one detection rule based on the newly-add candidate episode, wherein the incremental occurrence frequency is a ratio of occurrence times of the incremental episode relative to the occurrence times of all historical episodes within the incremental time period, wherein the batch occurrence frequency is a ratio of occurrence times of the batch episode relative to the occurrence times of the historical candidate episodes comprising the same set of events, wherein the incremental time period is less than the batch time period, wherein when the incremental candidate pattern is the batch candidate pattern, determining the incremental candidate pattern as the newly-add candidate episode, wherein when the incremental candidate pattern is not the batch candidate pattern, the occurrence frequency is calculated as $((\Delta s \times |\Delta D|)/(|D|+|\Delta D|))$, wherein the number of the historical candidate episodes is D, all the episodes within the incremental time period is $\Delta D$, and an occurrence possibility of the incremental candidate pattern is $\Delta S$, wherein when the batch candidate pattern is not the incremental candidate pattern, the occurrence frequency is calculated as $((s \times |D|)/(|D|+|\Delta D|))$, wherein an occurrence possibility of the batch candidate pattern is s.

* * * * *